United States Patent
Pilon et al.

(10) Patent No.: US 12,180,071 B2
(45) Date of Patent: Dec. 31, 2024

(54) SYSTEM AND METHOD FOR REMOVING ORGANICS FROM PHOSPHATE ORE

(71) Applicant: KOR Mineral Technologies Inc., Coldwater (CA)

(72) Inventors: Richard Pilon, Coldwater (CA); Marek Pawlik, Vancouver (CA); Michael Ryan MacIVER, Vancouver (CA)

(73) Assignee: KOR MINERAL TECHNOLOGIES INC., Coldwater (CA)

( * ) Notice: Subject to any disclaimer, the term of this patent is extended or adjusted under 35 U.S.C. 154(b) by 1154 days.

(21) Appl. No.: 16/376,867

(22) Filed: Apr. 5, 2019

(65) Prior Publication Data
US 2020/0317521 A1  Oct. 8, 2020

(51) Int. Cl.
*C01B 25/26* (2006.01)

(52) U.S. Cl.
CPC .................. *C01B 25/265* (2013.01)

(58) Field of Classification Search
CPC .............. C01B 25/265; C01B 25/01
See application file for complete search history.

(56) References Cited

U.S. PATENT DOCUMENTS

| | | | | |
|---|---|---|---|---|
| 3,032,197 A * | 5/1962 | Northcott | ............... | B03D 1/008 209/166 |
| 4,436,616 A * | 3/1984 | Dufour | ............... | B03B 9/00 209/166 |
| 4,565,625 A * | 1/1986 | Hsieh | ............... | B03D 1/021 209/167 |
| 4,737,273 A * | 4/1988 | Snow | ............... | B03D 1/021 209/166 |
| 5,221,466 A * | 6/1993 | Garcia | ............... | B03D 1/002 209/166 |

FOREIGN PATENT DOCUMENTS

CA  2849653  10/2015

OTHER PUBLICATIONS

El-Shall et al., "Comparative analysis of dolomite/francolite floatation techniques," Minerals and Metallurgical Processing 13, 135-140 (1996). (Year: 1996).*

(Continued)

*Primary Examiner* — Anthony J Zimmer
(74) *Attorney, Agent, or Firm* — Gardiner Roberts LLP (57) ABSTRACT

This disclosure describes methods, processes and devices that remove or release organics from ores, such as phosphate ores or secondary sources such as mine tailings or waste. The method comprises: preparing an ore to a pre-set size; mixing the ore with a reagent having an initial pH value in a slurry comprising the ore and the reagent; and while mixing the slurry, maintaining a pH level in the slurry to a pH range. While mixing the slurry, the slurry may produce a supernatant containing organic material removed from the ore and sediment containing refined ore. The method may also screen the slurry to create a first stream of materials that does not pass through the screen and a second stream of materials and refined ore that pass through the screen.

17 Claims, 3 Drawing Sheets

(56) References Cited

OTHER PUBLICATIONS

Rule et al., "Floatation of Carbonate Minerals From Unaltered Phosphate Ores of the Phosphoria Formation," US Dept. of the Interior, Bureau of Mines Report of Investigations 1974. (Year: 1974).*

Abdel-Khalek et al., "Floatation of Egyptian Newly Discovered Fine Phosphate Ore of Nile Valley," Proceedings of the International Conference on Mining, Material and Metallurgical Engineering, Prague, Czech Republic, Aug. 11-12, 2014. (Year: 2014).*

* cited by examiner

SYSTEM AND METHOD FOR REMOVING ORGANICS FROM PHOSPHATE ORE

FIELD OF THE DISCLOSURE

The present disclosure relates to methods, processes and systems for removing or releasing organic compounds from an ore such that the ore may be more amenable to treatment for the purpose of phosphate beneficiation or for the extraction of the organic component. Exemplary ores include sedimentary phosphate ores and secondary mineral sources, such as tailings or mine waste.

DESCRIPTION OF THE BACKGROUND

Ore is a rock or sediment that contains a sufficient quantity of economically important minerals. The ore may contain various amounts of undesirable components, referred to as gangue or waste minerals. The target minerals are extracted ("beneficiated") from the ore by, in part, removing or reducing the gangue mineral(s). Beneficiation produces a stream of higher-grade concentrated target minerals (compared with the target minerals in the original, unprocessed ore) and a stream of waste tailings containing removed gangue. Secondary or non-traditional sources of target minerals may include mine tailings or waste streams. Mining and processing mine tailings or waste may become economically beneficial depending on economic factors (e.g. commodity prices) and changes in extraction technologies.

Phosphate ores contain target phosphorous compounds, which may be used in various phosphorus-containing products, including mineral fertilizers, phosphate mineral supplements and phosphate salts. Phosphate ores are classified into two main formations: phosphorites and apatites. Exemplary apatite phosphate minerals include fluorapatite, carbonate apatite, francolite, kurskite, hydroxylapatite and others. The phosphorous content of phosphate ores is typically referred to in terms of equivalent $P_2O_5$ and may vary between approximately 2 and 35%, depending on mining and geological conditions and other factors. Phosphate ores also occur in forms such as aluminum phosphates and iron phosphates. Exemplary by-product and trace minerals in phosphate ores include nepheline, sphene, titanomagnetite, magnetite, aegirine, strontium, rare-earth elements and others.

Phosphate ores may also contain impurities, such as clay minerals (as fine phyllosilicates), dolomite, calcite, quartz, chalcedony, glauconite, pyrite, iron hydroxides and organic components ("organics"). The organic content of sedimentary phosphate deposits may vary widely and negatively affect processes used to beneficiate the phosphate.

Two beneficiation processes to remove organics are calcination and (froth) flotation. Calcination processes combust the organics at extremely high temperatures, which tends to increase operating costs, and gaseous emissions. Flotation is not effective when organic (or gangue) material adheres to an ore, causing different mineral particles in the ore to float together, thereby impeding separation of a target mineral from the ore.

There is a need to improve processing and treatments of ores that contain organics to improve beneficiation and extraction processes.

SUMMARY OF THE DISCLOSURE

In a first aspect of this disclosure, a method for removing organics from ores is provided. The method comprises: preparing an ore to a pre-set size (e.g. approximately 4 mm or less); mixing the ore with a reagent having an initial pH value in a slurry comprising the ore and the reagent; and while mixing the slurry, maintaining a pH level in the slurry to a pH range.

In the method, while mixing the slurry, a supernatant containing gangue minerals and organic material is removed and a refined, higher grade sediment is produced.

In the method, the slurry may be mixed using an attrition scrubber or other vessel equipped with a mechanical agitator.

In the method, the ore may be a phosphate ore.

In the method, the pH range may be acidic (e.g. between approximately pH 2.0 and 4.5); and the reagent may comprise sulfuric acid. Alternatively, the pH range may be alkaline (e.g. between approximately pH 10.0 and 11.5); and the reagent may comprise sodium hydroxide.

In the method, the attrition scrubber may mix the slurry until a stop condition is met. A stop condition may comprise: a pre-set time, a change in a physical variable, or a change in a chemical variable. For example, slurry viscosity or particle size may be monitored for a stop condition.

The method may further comprise separating particles based on size or classification to isolate a higher grade process fraction.

The method may further comprise: multi-stage particle size classification or size separation by the use of screening or filter media of varying size to produce multiple process streams of varying size and grade for downstream processing or as a finished product.

The method may further comprise treating one of the process fractions with froth flotation to beneficiate the target mineral.

The method may further comprise: further grinding of oversize ore or process fractions, sometimes referred to as a "grinding circuit," to produce a feed for the attrition scrubber for further conditioning.

The method may further comprise: additional particle size separation of any process fraction to remove high-grade refined ore therefrom.

In another aspect, a process for removing organics from a phosphate ore is provided. The process comprises: crushing the ore to a desired target size (e.g. to a size of <4 mm); conditioning the phosphate ore as a slurry with a pH modifying reagent; producing a supernatant enriched with organic material and gangue minerals and a phosphate-enriched sediment.

When conditioning the phosphate ore, the pH range may be acidic (e.g. between approximately pH 2.0 and 4.5) and the reagent may comprise sulfuric acid. Alternatively, the pH range may be alkaline (e.g. between approximately pH 10.0 and 11.5) and the reagent may comprise sodium hydroxide. The pH of the slurry is maintained throughout the conditioning step by the addition of more reagent while the slurry is mixed in the stirring vessel (e.g. attrition scrubber).

The process may further comprise: separation by particle size or size classification by screening to produce a first process stream that does not pass through the screen and a second process stream that does pass through the screen; where the smaller size fraction is the refined or phosphate-enriched process stream.

The process may further comprise: additional screening to remove organic-rich supernatant from the enriched or refined product.

The process may further comprise treating a process stream, in this case the phosphate-enriched sediment stream, with froth flotation to separate the refined ore from the gangue minerals.

The process may further comprise: grinding ore in the first stream producing ground ore; and feeding the ground ore to the attrition scrubber for further conditioning.

In another aspect, an attrition scrubber is provided implementing aspects of the mixing processes described above.

In other aspects, various combinations of sets and subsets of the above aspects are provided.

BRIEF DESCRIPTION OF THE DRAWINGS

Embodiments of the disclosure will now be described, by way of example only, with reference to the accompanying drawings, in which.

DETAILED DESCRIPTION OF EMBODIMENTS

Exemplary details of embodiments are provided herein. The description which follows and embodiments described therein are provided by way of illustration of an example or examples of particular embodiments of principles of the present disclosure. These examples are provided for the purposes of explanation and not a limitation of those principles and of the disclosure. In the description which follows, like parts are marked throughout the specification and the drawings with the same respective reference numerals.

Briefly, the disclosure describes systems, methods and techniques that increase grades and recoveries from phosphate ores, while reducing how much and how finely the target phosphate is ground (i.e. reduced in particle size) while still assisting with liberation. As is known in the art, grinding refers to size reduction of particles to "finer" sizes, typically on the order of 200 microns or less. If the target phosphate is ground to a particle size that is too small, downstream recovery of phosphate may be adversely affected, for example in a floatation process. It will be seen that higher-grade ore resulting from an embodiment may improve beneficiation yields from an ore at a mill, thereby increasing production at the mill and extending an operating life of an existing mine.

Embodiments are described herein that release organic material in an ore, with one embodiment directed to processing phosphate ore. The organic material is typically associated with clays and aluminum with intermittent inclusions in phosphate particles, and appears to be situated between grain boundaries in the phosphate ore. Embodiments described herein assist with releasing organics from ores, by in part, causing the organics to be "unglued" as a connecting component in the ore. In some cases, this may cause the partial or complete removal of organic material from the ore. It will be appreciated that the terms "releasing" and "release" are used in context of causing such ungluing of organics from ores. Embodiments described herein describe refinement processes that aim to preserve the size and texture of phosphate particles contained in the original ore.

One refinement process utilizes a reagent to extract gangue material from a phosphate ore. It has been determined that organic material in an ore may negatively impact beneficiation processes conducted on the ore, such as froth flotation. One aspect of an embodiment provides an increased adhering surface area for the target ore, which aids in mineral attachment during flotation.

Figure 1:
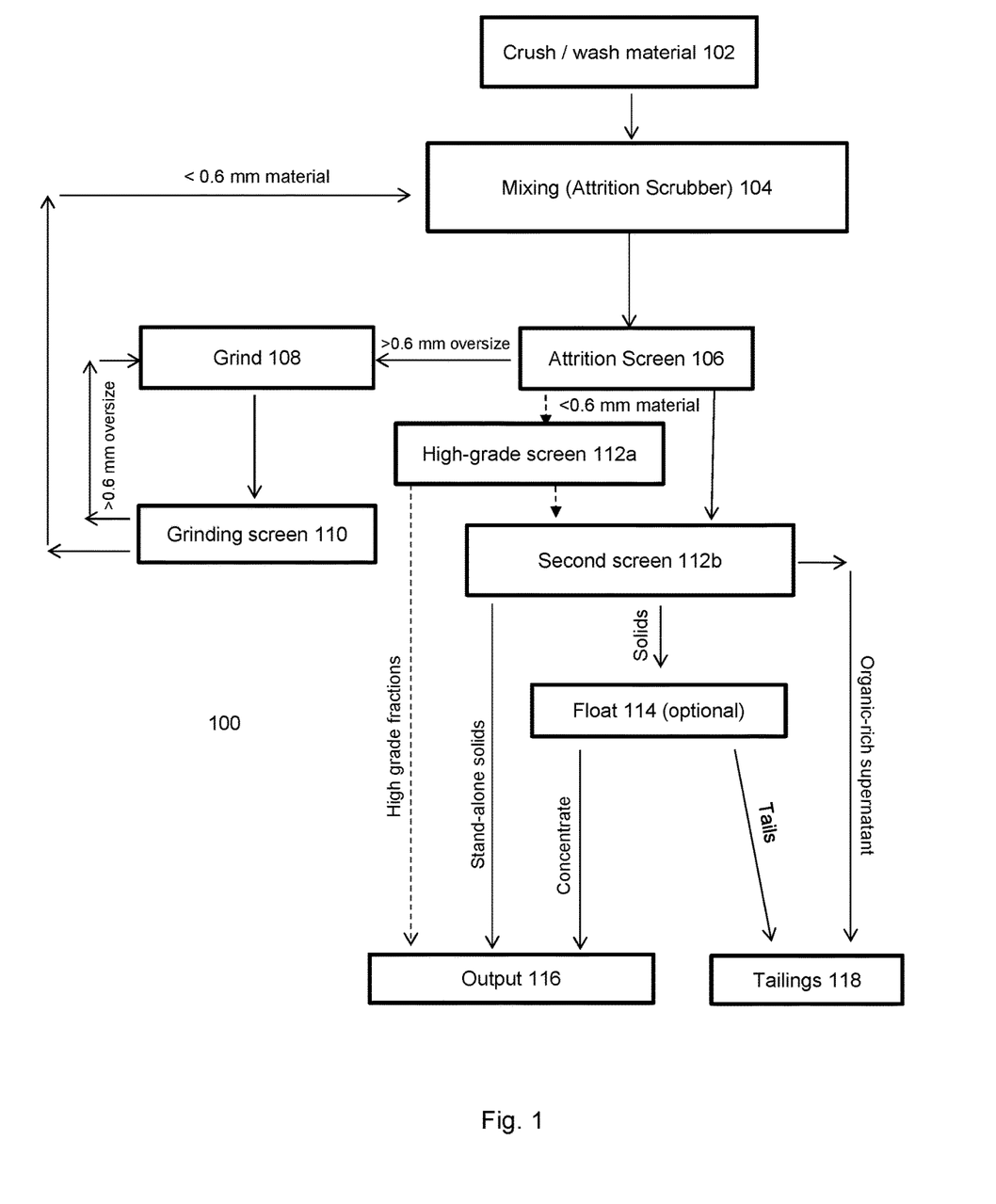
FIG. 1 is a flow chart of an exemplary process according to an embodiment.

FIG. 1 shows process 100 illustrating aspects of an embodiment for reducing gangue material in an ore. Therein at process 102, raw ore (i.e. unprocessed ore) extracted from a site is crushed by a jaw crusher or comparable ore crushing machine. The crushed ore may then be sent to a pre-crusher stage which reduces the ore particle size to a cross-section diameter of approximately 200 mm or less. The ore may then be further crushed to a particle size having a cross-section diameter of approximately 4 mm or less. For embodiments, particles with such an initial cross-section size still produce acceptable phosphate recovery.

Next, at process 104, the crushed ore is mixed with a reagent to modify the pH value of the ore to condition the ore and assist with releasing organic material from the ore and gangue. The ore may have an initial moisture content of approximately 10% (by weight). In one embodiment, the mixture is between approximately 30% and 75% weight/weight ("w/w") of ore with reagent. Conditioning the ore with an appropriate reagent as described herein imparts chemical/physical change(s) in the ore causing target minerals to be separated from gangue minerals and organic carbon. With this de-agglomeration, separation of organic material from the ore mixture is facilitated.

One embodiment conditions the mixture to be acidic by adding an acid reagent to a target pH value of between approximately pH 2.0 and 4.5. In one embodiment, sulfuric acid is used. Another embodiment conditions the mixture to be alkaline by adding an alkaline reagent to a pH value of between approximately pH 10.0 and 11.5. In one embodiment, sodium hydroxide (NaOH) is used. In determining whether to use either an acidic or an alkaline reagent, any one or more of the following factors may be considered:

Concentrate grade requirements;

Type of organics present (e.g. light or dark particles, soluble or insoluble organics in aqueous solutions or in organic solvents);

Feed grade characteristics, including for example dolomite and MgO content, which in one extraction are both categorized as waste products;

$P_2O_5$ recovery requirements;

MgO levels;

Reagent costs and availability;

Operational equipment issues; and

Environmental impact issues.

In one embodiment, use of an acidic reagent generally provided higher yields than use of an alkaline reagent. However, an alkaline reagent provides operational flexibility for a processing plant. In one embodiment, the molarity of the reagent does not change significantly in regards to the (target) pH level for the mixture. In other embodiments, different reagent concentrations (molarities) may be used depending on the pH level targeted.

For an acid-based reagent, any acid or acid mixtures that can establish its target pH level may be used, including organic acids such as acetic acid or citric acid. As well, processes that generate acids may be used, for example, by bubbling an acid-generating gas such as sulfur oxide ($SO_x$) or nitrogen oxide ($N_xO_y$) through the mixture. For an alkaline-based reagent, any alkaline or alkaline mixtures that can establish its target pH level may be used, including caustic materials such as soda ash (sodium carbonate), limestone, ammonia, alkali metal carbonates and hydroxides, lime or a blend of alkaline minerals, such as a blend of soda ash and sodium hydroxide.

As part of process 104, the mixture of ore and reagent is conditioned by vigorous mechanical agitation. In one embodiment, the slurry is mixed in an attrition scrubber for approximately between 5 and 30 minutes. In a typical attrition scrubber, material is fed into one end of a vessel and the material is mixed or agitated by a set of paddles or blades. The high-velocity axial and radial motions of the mixing system provides a particle-on-particle scrubbing action for the mixture. The scrubber may be operated continuously or as part of a batch of scrubbers. Other mixing systems may be used. During the conditioning process, gangue minerals and organic matter are released from the ore into the slurry. During conditioning with reagents, the pH level of the slurry may change, and the viscosity of the slurry may tend to increase. The pH level of the slurry may be checked continuously or intermittently. If the pH level drops outside its target pH value or range, more reagent (or a suitable alternative) may be added as required to reset the pH level to or towards its target value or range. It will be appreciated that a selected acid or alkaline condition for the reagent and the conditioning time depend typically on parameters of the operation and the composition of the ore. In maintaining the pH level, additional reagent(s) may be added at any convenient stage. For example, additional reagents may be added to any one or more of: water that is added to the attrition scrubber; the slurry prior to entering the scrubber; or the attrition scrubber tank with the slurry. Reagents may be added at various times and doses as long as the target pH level is maintained.

After conditioning process 104, output from the attrition scrubber (or other agitated vessel) is screened into separate streams based on size (and target materials). Screening may be used at a specific screen size or cut size, to separate oversize particles, which do not pass through the screen, from undersize particles, which pass through the screen. Therein, after screening 106, a first stream of slurry having materials with cross-section of greater than the screen aperture is separated from a second stream of slurry having materials with a cross-section of smaller than the screen aperture. The target ores in the second stream may be more easily extracted from that stream than the target ores in the first stream. The first and second slurry streams may be processed separately. In one embodiment, a screen aperture of approximately 0.6 mm (cross-section) is used, although larger apertures may be used (e.g. apertures of approximately 0.8 mm, 1.0 mm or larger). The specific screen opening, media, or mesh size selected typically depends on a grade-versus-particle size analysis. In an embodiment, a screen between sizes of approximately 0.6 and 1.0 mm may be used, where the undersize material contains the phosphate enriched process fraction. It will be appreciated that other screen aperture sizes may be employed or that the oversize process fraction is the enriched fraction, again, depending on a grade-versus-particle size analysis.

In the first slurry stream, the contained oversized materials are re-ground in process 108 to reduce their particle size. A grinding mill containing balls or rods as grinding media may be used. In one embodiment, the mill circuit product size is set to 0.6 mm. After grinding, the ground material is screened in grinding screen process 110 at 0.6 mm. Ground material that is less than 0.6 mm in size is returned to attrition scrubber process 104 for additional conditioning. Ground material that is greater than 0.6 mm in size may be reground in process 108.

The second slurry stream is further processed to reduce its organic material, first by analysis of its mineral particle size to evaluate the quality of the conditioned ore.

The second slurry stream from process 106, may contain high-grade size fractions of ore that may be easily removed and classified as final product per output 116. The remaining slurry of the second slurry stream is provided to one or more screens 112, such as through high-grade screen 112a and second screen 112b or through only second screen 112b, to further screen the second slurry stream to separate the supernatant from the solids components. If a high-grade fraction has been identified in the second stream, that fraction may be extracted by processing the second stream through high-grade screen 112a. Alternatively, if no high-grade fraction has been identified, then all of the slurry from process 106 may by-pass screen 112a and be screened through second screen 112b. In one embodiment, the second screen size is approximately 38 microns; it will be appreciated that screening size is ore-dependent. Organic materials that were released from the crushed ore during conditioning process 104 remain in the supernatant and will pass through screens 112a and/or 112b. Solid components that do not pass through high-grade screen 112a may contain target ore, which may be of sufficient quality to be provided as output 116. Alternatively, the remaining target ore may be screened again in process 112b and subjected to an additional flotation process 114 for further beneficiation. Tailings from processes 112b and 114 may be classified as tailings 118.

It will be appreciated that attrition scrubbing process 104 may by itself provide an independent extraction process without having a subsequent flotation process. In such a configuration, attrition scrubber process 104 may be followed by a screening process or another size separation process or device (for example cyclones, thickeners or classifiers) to remove the supernatant. In some cases, this would warrant some level of consideration and the decision would of course be based on a variety of input requirements.

Process 100 has demonstrated to work effectively at various ambient temperatures, e.g. in environments between approximately 20° C. and 60° C. Higher operating temperatures may enhance recoveries from embodiments.

It will be appreciated that the determined size fraction is a guideline. Each processed ore type may be analyzed for its mineralogy and liberation characteristics to identify an appropriate size fraction suitable for that ore that may be used during the preparation stage.

It will be appreciated that ores extracted from different sites will typically have different compositions and structures. As such, parameters for process 100 may be varied for different ore types, including particle size from crushing process 102, attrition scrubber conditioning time process 104, screening processes 106, 110, 112a and 112b, and grinding process 108.

Where process 100 refers to "screening", it will be appreciated that the term incorporates any screening, separating, or other method to separate liquids and solids. As such, while an embodiment utilizes an attrition scrubber in process 104, other mixing/agitating processes may alternatively and/or additionally be used to assist in separating the gangue. Herein, the term "attrition scrubbing" may refer to any type of mixing system, process or machine that agitates a slurry causing a release of materials into a supernatant.

Where process 100 refers to a "final product", this refers to a terminal product that is produced by an embodiment. This final product, in turn, may be further processed downstream in industry.

Figure 2:
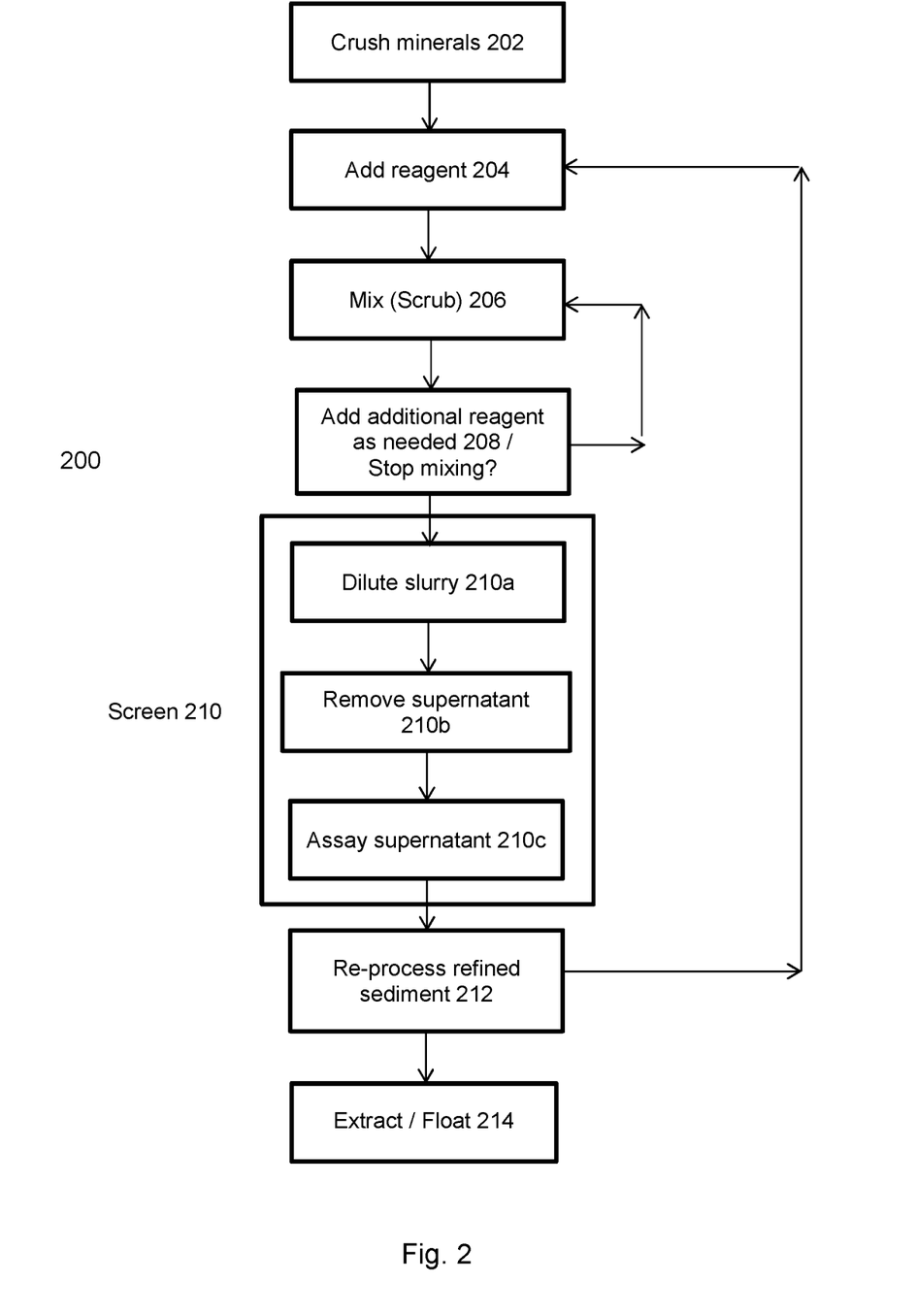
FIG. 2 is a flow chart of another exemplary process according to an embodiment.

Now, FIG. 2 shows process 200 illustrating aspects of another embodiment for reducing gangue material in an ore. Therein at process 202, raw ore is crushed using a jaw crusher or other similar crushing mechanisms. Next at process 204, a reagent is added to the ore, which in one embodiment is a solution of approximately 3 moles per litre (mol/L) of NaOH, creating an initial alkaline slurry. This initial slurry may have a solids content between 30 and 85% w/w, while the remainder of the slurry is the aqueous, alkaline solution at the desired pH. The required amount of NaOH required to maintain the target pH may vary depending on the composition of the feed ore.

Next in a conditioning loop of processes 206 and 208, at process 206, the slurry is stirred in an attrition cell (i.e. a type of attrition scrubber) in a mixture of approximately 65% w/w solids. The stir rate is approximately 900 rotations per minute (RPM). At process 208, the pH level of the slurry is checked and, as needed, additional reagent may be added to maintain a target pH level of the slurry at its intended range (here between approximately 10.5 and 11.5). When the viscosity of the slurry changes as it is stirred, this indicates that gangue material and/or organic matter in the ore has been dispersed from the ore. In one configuration, the viscosity of the slurry decreased after approximately 30 minutes of stirring. Meanwhile, the pH level of the slurry is checked and adjusted when the pH level changes. The conditioning loop continues until a predetermined stop condition is detected or determined. For the conditioning loop, the slurry may periodically be analyzed for its organic carbon content to determine how much organic matter has been released from the ore. For example, from the analysis, a stop condition may be any one or more of: a detected amount of change in viscosity or particle size or of organic matter in the process water. When the analysis establishes that the amount of released organic matter has stabilized to a threshold, that related time may also be a stop condition. In one embodiment, the conditioning is performed for approximately 60 minutes.

After the conditioning loop is completed, the conditioned slurry is screened in process 210. Therein, first, the slurry is diluted in process 210a. One dilution level adds pH-adjusted water (conditioned with the reagent) to 30% w/w solids. The diluted slurry is agitated to promote dispersion of the water through the slurry. Next at process 210b, the slurry is provided to a container and the slurry is left to settle the solid particles from the supernatant. A settlement agent, such as kerosene, may be added to the slurry. After an appropriate passage of settlement time (determined either by time or by detection of a sufficient amount of sediment), the supernatant is removed, leaving the settlement particles as sediment at the bottom of the container. In one embodiment the settling time is approximately 15 to 20 minutes and the supernatant is removed using a vacuum process. Longer settlement times may typically result in more sediment, up to a point of practical stasis of settlement. A turbidity value, organic carbon assay, or infrared-spectroscopy assay of the supernatant may be indicative of the amount of organic material contained therein. At process 210c, the separated supernatant may be dried and assayed for notable ores. It was observed that when an alkaline reagent was used, the colour and clarity of the supernatant became lighter over longer settling times or with additional conditioning time (while still containing organic material). When an acid reagent was used, the colour and clarity of the supernatant tended towards dark and opaque. The supernatant may contain various humic fractions such as humic and fulvic acids and humin, which may be useful themselves as a by-product, for example as pre-conditioner for a fertilizer application.

At process 212, the sediment (now in a more concentrated form), is re-suspended with a fresh reagent (at about 30% solids) in an attrition scrubber, effectively repeating processes 204, 206 and 208 and screening process 210, creating a twice-processed sediment ore. Other refinement processes may be used in addition to, or instead of re-processing as described herein. Once the re-processing is complete, a final froth flotation or reverse floatation may be provided in process 214.

In one sample, approximately 60% to 70% of clay and approximately 30% of silica, with other gangue minerals, were removed by a treatment process of an embodiment. The resulting sample had an increased equivalent $P_2O_5$ content, and approximately 50% of the original organics removed from the original ore that would have otherwise interfered with flotation in view of non-selective reagent adsorption and co-flotation.

It will be appreciated that in certain embodiments, after completion of a first (or subsequent) attrition scrub (processes 206 and 208) and subsequent screening and removal of supernatant (process 210), the extracted ore may be analyzed (e.g. by size) to determine a current ore quality. Then, one or more flotation processes (loop from process 212) may (or may not) be executed. As such, one embodiment may not loop from process 212. However, a subsequent flotation process may still be conducted once high-grade size fractions (graded as "final product") that do not require further beneficiation are removed.

Figure 3:
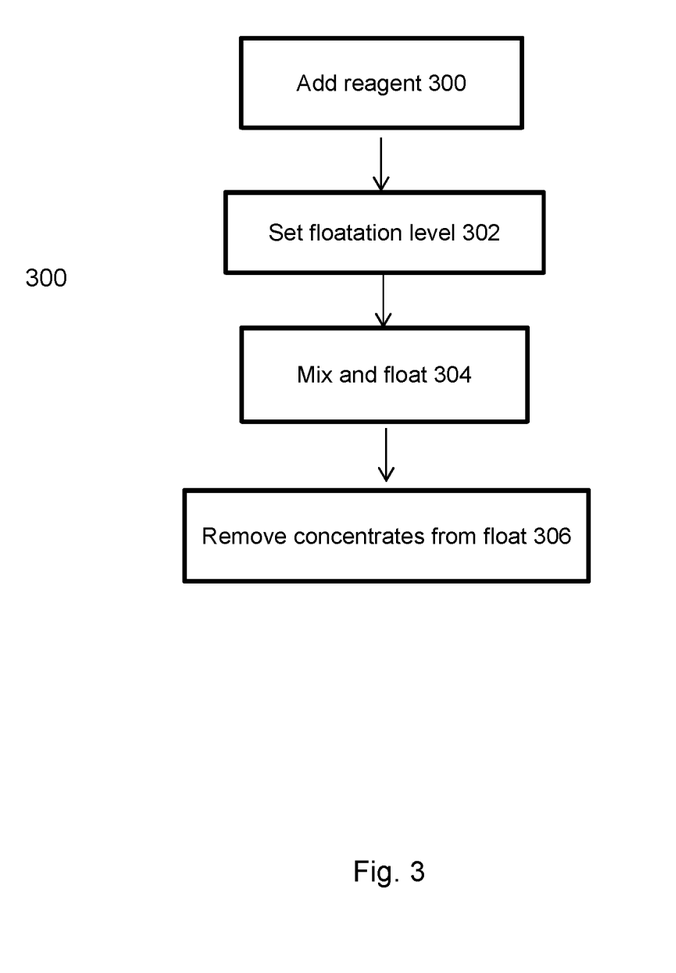
FIG. 3 is a flow chart of a flotation process according to an embodiment.

Now referring to FIG. 3, details of a froth flotation process are provided, which may be used as a beneficiation process of the refined ore extracted as an output (e.g. output 116, FIG. 1) of either process 100 or 200 (FIG. 1 or 2) or suitable alternatives. Generally, any flotation process may be used, for example, direct, reverse, coarse particle flotation, etc. with use of suitable reagents. For a direct flotation, calcium and/or magnesium ions in the reagents may limit yield. In one embodiment, a reverse flotation process, such as an amine flotation process is used, as amines are less sensitive to these ions and are generally used for targeted gangue mineral removal, such as clay, dolomite, silica and other minerals.

In process 300, a reagent is added to the refined ore to create a feed slurry. For an amine flotation the reagent provided has a pH level of approximately pH 5.5 initially, although other suitable pH levels for amine flotation may be used. This pH level may result in part from acid washing of the feed ore. If the feed ore is not acid washed, its pH may be higher (e.g. at pH 10.5). An acid, such as hydrochloric acid may be added (e.g. 0.1 M HCl) to reduce the pH of a non-acid washed feed. An embodiment may use other acids to decrease pH. Next at process 302, the feed slurry is mixed at a suitable rate and for a suitable time to provide sufficient dispersion of the reagent through the slurry. In one embodiment, the mixing was done at approximately 900 RPM for approximately 15 minutes. Then at process 304 a frother is added. One embodiment uses approximately 400 g/t of 1% w/w dodecylamine solution and approximately 4 g of 0.1% w/w frother (methyl isobutyl carbinol) and then mixes for approximately 10 minutes without air being added. Thereafter air is introduced to the slurry to induce frothing. Control of the air intake is used to control froth height and bubble size. Releasing too much air may cause very large bubbles to form. Then at process 306 concentrates are collected from the flotation. One flotation cycle may be completed in approximately 30 minutes.

In one flotation process, additional frother (5 g @ 0.1% w/w) and additional amine (4 g @ 1% w/w) may be added before reducing the air. In another flotation process, only an additional frother may be added.

Exemplary reverse (amine) flotation of the feed ore provided grades of approximately 26.5% $P_2O_5$ and recovery of approximately 39.8% $P_2O_5$.

It will be seen that an embodiment utilizes aggregate structure of ore particles and sufficiently outlined coarse phosphate grains to liberate phosphate grains from an ore and release clays and carbon associated with clays by disintegrating coarse particles in the ore while attempting to preserve the original size and texture of phosphate particles in the ore.

Other intermediary treatments may be used, such as immersing and soaking the ore in water and then exposing ultra-sonication and attrition-scrubbing.

While embodiments described herein relate to treatment and refinement of phosphate ores, it will be appreciated that embodiments described herein are applicable to other mineral processing systems where carbon/organics in an ore presents a yield issue.

It will be appreciated that in other embodiments, reagents having acidic pH ranges of at least approximately pH 2.0 or more and alkaline ranges of anything greater than approximately pH 8.5 may be used. In trials, embodiments using either sulphuric acid (at a pH level of approximately between pH 2 and 4.5) or sodium hydroxide (at pH level of approximately between 10 and 11.5) provided improvements of the overall $P_2O_5$ grade. The selected pH range is operation-dependent as different ore types may respond to different conditions. For example, with an acidic reagent having a pH level around approximately pH 1.0, some apatite may dissolve into the slurry, which is not preferred. As such, for an acidic reagent, its pH level may preferably be set at a threshold level that is sufficiently high to not cause dissolving of substantial quantities of apatite into the slurry. As well, for an alkaline reagent, its pH level may preferably be set at a threshold level that is sufficiently low to not cause dissolving of substantial quantities of apatite into the slurry.

As well, solids provided in attrition scrubbing may have a concentration typical of a solid-liquid suspension in mineral processing applications. A value of as low as approximately 25% may also be used. The scrubbing time may be reduced to approximately 5 minutes. The scrubbing time is ore-dependent and may be 30 minutes, 60 minutes or more, where separations require more conditioning.

The separation size for a screening process may depend on slimes content (which affects flotation performance), desired output product grade and overall recovery of the process. The screen size deployed may depend on coarseness and size of target ore particles. As such, in one embodiment the screen size may be approximately 100 microns or less. While one embodiment for $P_2O_5$ extraction uses a screen size of approximately 0.6 mm, ores that liberate at higher $P_2O_5$ size fractions would require a larger screen size. For such ores, a screen size may have an upper limit to be approximately between 0.6 mm and 1.2 mm.

It will be appreciated that for field processing of ores, the type and quality of equipment used may impact recovery rates. The design and use of a scrubber agitator and a tank that promote a high amount of particle-to-particle contact tends to promote particle breakage in the ore that facilitates release of organic matter during the scrubbing process. A scrubbing tank may be designed to promote particle-to-particle contact, for example, by placing an impeller in proximity to its walls or by providing baffles located in its corners. Impeller design, speed, size, mixing direction(s) and operation may also affect the release of organic matter.

Exemplary processing and extraction results are shown in Tables A and B following for three rougher concentrates (Rougher Conc 1, 2 and 3) of slurry as processed through mixing with a reagent (e.g. process 200, FIG. 2) and then froth flotation (e.g. process 300, FIG. 3) using reagents having pH in the range of approximately 11 to 11.5. In Table A, the Calculated Head figures represent percentages of materials in the original, unprocessed ore. In this embodiment, the target minerals are $P_2O_5$ and CaO and the gangue minerals are MgO, $Al_2O_3$, $Fe_2O_3$ and $SiO_2$. It was found that in the process, silica floated nearly to completion, where approximately 89% of the original silica was removed from the feed. The Rougher Conc figures show the amounts of the identified minerals after flotation. For example, for Rougher Conc 3, the content of target $P_2O_5$ in the unprocessed ore was approximately 13.83% and the content of $P_2O_5$ post-treatment, post-flotation increased to approximately 34.65%; meanwhile, the content of waste MgO in the unprocessed ore was approximately 0.90% and its content post-treatment, post-flotation decreased to approximately 0.46%. The Rougher Tails and Supernatant values show amounts of waste material. Table B shows recovery values expressed as a percentage of recovery from the original unprocessed ores.

TABLE A

| | | | Assays | | | | | |
|---|---|---|---|---|---|---|---|---|
| | | | | | Assays | | | |
| | Weight | % Wt | % $P_2O_5$ | % CaO | % MgO | % $Al_2O_3$ | % $Fe_2O_3$ | % $SiO_2$ |
| Rougher Conc 3 | 11.51 | 2.14% | 34.65 | 49.13 | 0.46 | 0.96 | 0.50 | 6.30 |
| Rougher Conc 2 | 76.40 | 14.21% | 23.95 | 34.74 | 0.80 | 2.06 | 0.80 | 29.43 |
| Rougher Conc 1 | 22.60 | 4.20% | 32.54 | 46.25 | 0.60 | 1.39 | 0.62 | 8.82 |
| Rougher Tails | 132.10 | 24.57% | 7.48 | 11.57 | 0.59 | 4.78 | 1.10 | 66.73 |
| Supernatant | 295.06 | 54.88% | 11.80 | 18.16 | 1.11 | 9.58 | 3.61 | 37.65 |
| Calculated Head | 537.67 | 100.00% | 13.83 | 20.74 | 0.90 | 6.80 | 2.40 | 41.74 |
| Head (assayed) | 545.10 | 100.00% | 13.64 | 20.77 | 0.77 | 5.37 | 1.77 | 47.4 |

TABLE B

| | | | Recoveries | | | | | |
|---|---|---|---|---|---|---|---|---|
| | | | | Recovery | | | | |
| | Weight | % Wt | % $P_2O_5$ | % CaO | % MgO | % $Al_2O_3$ | % $Fe_2O_3$ | % $SiO_2$ |
| Rougher Conc 3 | 11.51 | 2.14% | 5.36% | 5.07% | 1.09% | 0.30% | 0.45% | 0.32% |
| Rougher Conc 2 | 76.40 | 14.21% | 24.61% | 23.80% | 12.59% | 4.30% | 4.73% | 10.02% |
| Rougher Conc 1 | 22.60 | 4.20% | 9.89% | 9.37% | 2.79% | 0.86% | 1.09% | 0.89% |
| Rougher Tails | 132.10 | 24.57% | 13.29% | 13.71% | 16.06% | 17.26% | 11.25% | 39.28% |
| Supernatant | 295.06 | 54.88% | 46.84% | 48.05% | 67.47% | 77.27% | 82.48% | 49.50% |
| Calculated Head | 537.67 | 100.00% | 100.00% | 100.00% | 100.00% | 100.00% | 100.00% | 100.00% |
| Head (assayed) | 545.10 | 100.00% | 100.00% | 100.00% | 100.00% | 100.00% | 100.00% | 100.00% |

In Tables A and B, the combined Rougher Concs 1, 2 and 3 produced a weighted average $P_2O_5$ grade of approximately 26.8% from a Calculated Head feed grade of approximately 13.83% $P_2O_5$ with a $P_2O_5$ recovery of approximately 39.8%. Results shown in Tables A and B illustrate organic removal processes of embodiments that produce upgraded phosphate from lower grade tailings. Rougher Concs 1 and 3 show $P_2O_5$ values in excess of approximately 32% $P_2O_5$.

Embodiments described herein show that grades and yields are improved by having/providing any one or more of:

an initial process of preparing the ore to an approximate sizing provides improved yields;
conditioning of an ore in a suitable attrition scrubbing vessel (or equivalent);
use of sulfuric acid for one acidic reagent;
use of sodium hydroxide for one alkaline reagent;
operation within more ambient temperature ranges;
ores having solids content in the slurry between approximately 65% and 70%;
reduced time for attrition scrubbing, at noted pH and % solids, for between approximately 5 and 30 minutes (organic dependent); and
improved removal of organics released from the ore into the supernatant.

In this disclosure, where a range, threshold, time or expected value is provided as an approximate value (for example, when a range is qualified with the word "approximately"), a range of values will be understood to be valid for that value. For example, for a threshold stated as an approximate value, a range of about 25% larger and 25% smaller than the stated value may be used. Thresholds, range limits, times, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

As well, for this disclosure the conjunction "and/or" will be understood to indicate that any one or more of the conjoined items may occur and that a selection of items is not mutually exclusive, unless otherwise expressly stated. The conjunction is used as an inclusive "or".

It will be appreciated that the embodiments relating to methods, processes, devices, components, scrubbers, screens, flotation system, monitoring circuits, plants and systems may be implemented in a combination of mineral processing equipment, hardware, and related control systems and related software. It will further be appreciated that all methods, processes, algorithms, steps etc. as described herein may be conducted in one or more processes and machine(s).

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method for removing or releasing organics from ores, comprising:
    preparing an ore to a size of approximately 4 mm or less;
    mixing the ore with a reagent comprising sodium hydroxide and having an initial pH value in a slurry comprising the ore and the reagent;
    separating the slurry into a first stream of materials and a second stream of smaller materials separated from first stream of materials, the second stream comprising refined ore, using a screen having a screen size of between approximately 1.0 mm and 0.6 mm to create the first stream of materials that does not pass through the screen and the second stream of smaller materials that passes through the screen; and
    while mixing the slurry, maintaining a pH level in the slurry to a pH range.

2. The method for removing organics from ores as claimed in claim 1, wherein while mixing the slurry:
    a supernatant containing organic material is produced, which is removed from the ore; and
    sediment containing refined ore is produced.

3. The method for removing organics from ores as claimed in claim 2, wherein:
    the slurry is mixed using an attrition scrubbing device.

4. The method for removing organics from ores as claimed in claim 3, wherein:
    the ore is a phosphate ore.

5. The method for removing organics from ores as claimed in claim 4, wherein:
    the pH range is between approximately pH 10.0 and 11.5.

6. The method for removing organics from ores as claimed in claim 5, further comprising:
    mixing the slurry until a stop condition for the ore is reached, the stop condition being any one or more of a pre-set time, detection of a change in viscosity in the slurry, or detection of a change of particle size in the slurry.

7. The method for removing organics from ores as claimed in claim 1, further comprising:
  screening the second stream through a second screen; and
  removing the refined ore from material that passes through the second screen.

8. The method for removing organics from ores as claimed in claim 7, further comprising:
  treating the second stream to froth flotation to separate the refined ore from gangue minerals therein.

9. The method for removing organics from ores as claimed in claim 1, further comprising:
  grinding ore in the first stream producing ground ore; and
  feeding the ground ore to slurry for further conditioning.

10. The method for removing organics from ores as claimed in claim 1, further comprising:
  screening the second stream of smaller materials to remove high-grade size fractions of refined ore therefrom.

11. A process for removing organics from phosphate ores crushed to a particle size of 4.0 mm or less, the process comprising:
  conditioning a phosphate ore with a reagent having an initial pH value to produce a slurry;
  mixing the slurry in an attrition scrubbing device, where the slurry produces a supernatant containing organic material removed from the phosphate ore and sediment containing refined phosphate ore;
  separating the slurry into a first stream of materials and a second stream of smaller materials, the second stream comprising refined phosphate ore, using a screen having a screen size of between approximately 1.0 mm and 0.6 mm to create the first stream of materials that does not pass through the screen and the second stream of smaller materials that passes through the screen;
  grinding the phosphate ore in the first stream producing ground ore;
  mixing the ground ore into the slurry for further conditioning;
  maintaining a pH level in the slurry to a pH range;
  removing the refined phosphate ore from the second stream; and
  after removing the refined phosphate ore, treating the second stream to flotation to separate remaining refined phosphate ore from gangue minerals therein.

12. The process for removing organics from phosphate ores as claimed in claim 11, wherein:
  the pH range is alkaline between approximately pH 10.0 and 11.5; and
  the reagent comprises sodium hydroxide.

13. The process for removing organics from phosphate ores as claimed in claim 11, further comprising:
  screening the second stream to remove high-grade size fraction of refined ore therefrom.

14. The process for removing organics from phosphate ores as claimed in claim 11, further comprising:
  mixing the slurry until a stop condition for the ore is reached, the stop condition being any one or more of a pre-set time, detection of a change in viscosity in the slurry, or detection of a change of particle size in the slurry.

15. A method for removing or releasing organics from phosphate ore, where the phosphate ore has been prepared to a size of approximately 4 mm or less, the method comprising:
  mixing the phosphate ore with an alkaline reagent in a slurry comprising the phosphate ore and the alkaline reagent;
  mixing the slurry in an attrition scrubbing device while maintaining a pH level in the slurry to a pH range; and
  removing a supernatant containing organic material to produce sediment containing refined phosphate ore; and
  using a screen having a screen size of between approximately 1.00 mm and 0.6 mm to separate the slurry to create a first stream of materials and a second stream of smaller materials, the second stream comprising refined ore and the refined ore having a size of approximately 1.0 mm or less; and
  stop mixing the slurry after detection in the slurry of a change in viscosity or a change of particle size.

16. The process for removing organics from a phosphate ore as claimed in claim 15, wherein:
  the pH range is between approximately pH 10.0 and 11.5; and
  the reagent comprises sodium hydroxide.

17. The method for removing organics from an ore as claimed in claim 16 further comprising:
  screening the second stream of smaller materials through a second screen; and
  removing the refined ore from material that passes through the second screen.

* * * * *